July 19, 1932. A. KAROLUS Re. 18,537

RECEIVER ARRANGEMENT FOR ELECTRIC TELEVISION APPARATUS

Original Filed Aug. 31, 1926

INVENTOR
AUGUST KAROLUS
BY W. S. Grover
ATTORNEY

Reissued July 19, 1932 Re. 18,537

UNITED STATES PATENT OFFICE

AUGUST KAROLUS, OF LEIPZIG, GERMANY, ASSIGNOR TO RADIO CORPORATION OF AMERICA, A CORPORATION OF DELAWARE

RECEIVER ARRANGEMENT FOR ELECTRIC TELEVISION APPARATUS

Original No. 1,762,231, dated June 10, 1930, Serial No. 132,702, filed August 31, 1926, and in Germany September 5, 1925. Application for reissue filed September 23, 1930. Serial No. 483,960.

My invention relates to a receiver arrangement for electric television apparatus and has for its objects simplification of the optical arrangement and greater brightness of the television image.

A television apparatus usually comprises a source of light, a light relay by which the light radiated from the source is regulated in accordance with the relative brightness of the several areas of the image transmitted by the sender, means for coordinating the areas so transmitted and which constitute the image, said means operating in synchronism with the means at the sender for breaking up the image, and optical auxiliaries.

Heretofore the general arrangement of the principal parts constituting a receiver was such that the light from the light source was first regulated as to its brightness by the light relay and then directed to the coordinating means which projected the image into a single plane or on a suitable screen for observation.

In contradistinction to this known arrangement, in my invention the light is directed onto the screen or the image plane as radiated from the light source, that is without previous regulation as to brightness and the image is then viewed through the medium of the lighting relay which is arranged intermediate the eye and the image. The light from the source may be radiated freely onto the entire plane of the image in which case the means for co-ordinating the areas into the complete image serves for directing the light rays issuing from the several dots in the illuminated plane into the light relay and into the observer's eye, or the entire radiation of light from the source is concentrated and directed on the image plane by the area coordinator.

In this novel arrangement of parts in the receiver only that portion of the light radiation which is projected into the eye at a given time is varied as to its brightness, in contradistinction to the existing arrangement in which the entire radiation from the source of light had to pass the light relay.

The advantages of the novel arrangement are particularly important where electrically controlled relays are provided the operation of which is based on the known electro-optical or magneto-optical effect on polarized light. Effects which may be applied in the present instance are principally: The Faraday effect in which the rotation of the polarization plane of the light is utilized by a magnetic field; the Kerr phenomenon, rotation of the polarization plane of the light during the reflection at a magnetized mirror; and the Kerr effect, electrical double refraction in a condenser filled with a suitable transparent medium. A very suitable light relay for television apparatus is the Kerr cell on account of its lack of inertia and its quantitative effect due to which it may be used for the highest frequencies. However, its load is limited to a predetermined maximum quantity of light and therefore this maximum was a limit for the intensity of the source of light with the above-mentioned arrangement of parts since the total quantity of light radiated from the source had to pass the Kerr cell and only a fraction of this quantity got into the eye of the observer.

In my novel arrangement, on the other hand, it is possible to increase the intensity of the source of light to such an extent that the fraction of its light which is projected into the observer's eye, is at the limit of load for the Kerr cell. Therefore, the brightness of the image will be much higher than in the known arrangements.

The arrangement according to my invention involves the further advantage of a considerable simplification of the optical auxiliaries. For instance if a Kerr cell is used in connection with the known arrangements it is necessary to provide systems of lenses for parallelizing the rays of the bundle of light which system is dispensed with in my novel arrangement according to my invention as the eye is enabled to survey the entire plane of the image through the Kerr cell directly.

In the drawing affixed to this specification and forming part thereof television apparatus embodying my invention are illustrated diagrammatically by way of example.

In the drawing—

Figure 1:
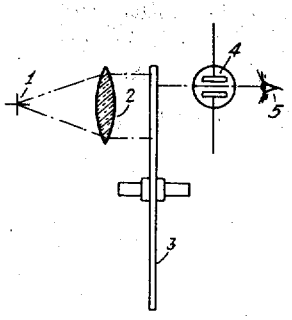
Figs. 1 and 2 illustrate diagrammatically an apparatus in which the image plane is illuminated entirely and by direct radiation.
Figure 2:
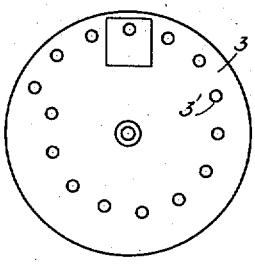

Referring now to Figs. 1 and 2, 1 is a source of light, 2 is a lens through which the light of the source is concentrated, and 3 is a plate on which the concentrated light is projected. The plate 3 may be of any suitable construction, for instance, it may be the known Nipkow perforated plate which serves for breaking up the image at the sender and is here utilized at the receiver for coordinating the transmitted areas into a complete image. A light relay, for instance a Kerr cell 4, may be arranged on the side of the plate 3 which is opposite the source of light 1, and 5 is the eye of the observer who surveys through the light relay 4 that part of the plate 3 which constitutes the image field. A ray of light which passes through one of the perforations 3′ of the plate 3 is projected into the eye 5 through the Kerr cell 4 in which its intensity is regulated. Only this fraction of the radiation and not the total quantity of light radiated from the source 1, passes through the Kerr cell 4.

Figure 3:
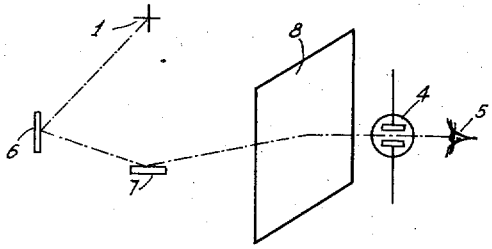
Fig. 3 illustrates an apparatus where the light rays are concentrated and directed across the field of the image.

Referring now to Fig. 3, the source of light, the light relay, which may be a Kerr cell, and the eye of the observer are indicated by the same reference numerals as in Figs. 1 and 2 but in this case the light from the source 1 which may be either an arc lamp or a glow lamp is directed onto two mirrors 6 and 7, which may, for instance, be arranged to pivot or oscillate in two planes at right angles to each other, for instance by arranging the mirror 6 to oscillate about the vertical axis and to reflect a light beam therefrom to the mirror 7 arranged to pivot or oscillate about a horizontal axis so as to direct the rays of light onto the screen 8 along two coordinates at right angles to each other. The focus point 11 upon the picture screen 8, due to the motion of the mirrors 6 and 7, travels over the entire surface in the shape of a relatively narrow zigzag line. The travelling or migration of this luminous spot of concentrated brightness is viewed through the light control cell 4 through the eye 5, and it is only by reason of the fact that the permeability of the cell 4 is controlled by the incoming current that a picture is produced in the eye. The advantage of this arrangement contrasted with that illustrated in the Figs. 1 and 2 resides in that the light falling from source 1 is concentrated at a single point on the screen 8, contradistinct from what is true of the scheme shown in Figs. 1 and 2 where only a small fraction of the light rendered parallel by the lens 2 and corresponding to the diaphragm aperture 3′ is utilized. Hence, in the arrangement as disclosed and illustrated by Fig. 3, the efficiency of the illuminous source 1 is many times higher and, in fact, it is particularly high on the ground that intensity control means inserted in the path of the rays between 1 and 11 may even be dispensed with according to this invention. It will be understood that this intensity controlling device would produce an impairing action on account of the loss of light incidentally produced thereby.

I wish it to be understood that I do not desire to be limited to the exact details of construction shown and described for obvious modifications such as are suggested by my copending application Serial No. 322,756, filed November 30, 1928, disclosing purely electrical means for positioning a light spot on a screen, will occur to a person skilled in the art, and I, therefore, believe myself to be entitled to make and use any and all of these modifications as fall fairly within the spirit and scope of the hereinafter appended claims.

I claim:—

1. A receiver for electric television apparatus including a light relay of the Kerr type, comprising, a light screen, a source of luminous rays, means for projecting said luminous rays as a position controlled point source of light upon said screen, and a light relay interposed between an observer and said screen whereby said observer when looking through said light relay toward said screen may view a series of position controlled light spots and visually construct a moving image upon said screen.

2. A receiver arrangement for electric television apparatus comprising, a source of light, a picture point distributor, an optical system including a plurality of oscillating mirrors for illuminating said distributor and moving concentrated light beams from said light source back and forth across said distributor surface in synchronism with a corresponding motion at a transmitting station, and a light relay positioned between an observer and said distributor, said relay being controlled by variations in received signal potentials for producing variations in the amount of light passing therethrough in accordance with said signals whereby an observer looking through said relay experiences changes in light intensities proportional to light intensities of an object viewed at a transmitting point.

3. An apparatus for electric television including a light source, a distributor screen, means positioned between said light source and said distributor screen for directing light as a point source to said screen and moving the light point with respect thereto, and a light relay positioned between an observer and said distributor screen, said light relay being subjected to variations in potential in accordance with signal pulses, whereby an observer viewing said screen through said relay receives an optical impression of light images produced by said variations in potential applied to said relay and corresponding to a like image at a point of transmission.

4. A receiver for electric television apparatus including a light relay of the Kerr type comprising a screen, a source of rays for producing a light spot upon said screen, means for projecting said rays as a position controlled point source upon said screen for producing light at different elemental areas thereof, and a light relay interposed between an observer and said screen whereby said observer when looking through said light relay toward said screen may view a series of position controlled light spots and visually construct a moving image upon said screen.

5. An apparatus for electric television including a distributor screen, a source of rays for producing a luminous effect upon said screen, means positioned between said source and said distributor screen for directing said rays as a point source upon said screen and moving the light point produced by said rays acting upon said screen with respect thereto, and a light relay positioned between an observer and said distributor screen, said light relay being subjected to variations in potential in accordance with signal pulses, whereby an observer viewing said screen through said relay receives an optical impression of light images produced by said variations in potential supplied to said relay corresponding to a like image at a point of transmission.

6. A television receiving system for electro-optically forming images at a receiving point of an object at a transmitting point comprising means for successively illuminating with equal intensity the elemental areas of a screen, a light valve for directly viewing said screen, and means for controlling the light valve by incoming image current, so as to cause the illumination of each elemental area of said screen when viewed through said light valve to assume an observable intensity corresponding to the intensity of light and shadow on coordinated elemental areas of an object at a transmitter.

7. A television receiving system comprising means for causing the elemental areas of a field to become illuminated with equal intensity light in the same sequence as the corresponding portions of the field of view at the transmitter are scanned, said light being of the same intensity for each elemental area and radiating with about the same intensity throughout a wide solid angle, a light valve for directly viewing said light field from a point lying within all of said angles and at such a distance from said field that only a small part of the light therefrom enters said valve, and means for controlling said light valve by incoming image currents.

8. A television receiving system comprising a light field in the form of a stationary screen, means for causing light spots to appear at each elemental area of the screen in the same sequence as the corresponding portions of the field of view at the transmitter are scanned, said light being of the same intensity for each elemental area and radiating with substantially the same intensity throughout a wide solid angle, a light valve for viewing said screen from a point lying within all of said angles and at such a distance from said screen that only a small part of the light enters said light valve, and means for controlling said light valve by incoming image currents.

9. The method of television which comprises causing a light spot to appear at each elemental area of a field in the same sequence as the corresponding areas of the field of view at the transmitter are scanned, said light spots being of the same intensity for each elemental area and radiating with about the same intensity throughout a wide solid angle, viewing said light field from a point lying within all of said angles and at a distance from said light field, and controlling in accordance with the incoming image current and substantially at the observing point the amount of light entering the eye of the observer by means of a light valve, whereby the valve controls only a small fraction of the emitted light.

10. A television receiving system comprising a receiving screen, means for causing the elemental areas of said screen to become illuminated in a predetermined sequence with light spots of the same intensity, a Kerr cell through which only a small part of the light from each of said elemental areas passes, and means to control said cell in accordance with variations in received image current.

11. In a television system, means for predeterminedly and uniformly causing a point of illumination to traverse an image plane, and means between said point and a second image plane for electrically eclipsing the light to produce the effects of variations in intensity of light and shadow on the first image plane.

12. In a television system, a viewing screen, means for causing each elemental area of the screen to become illuminated at each elemental area thereof with light of equal intensity along predetermined paths of recurring traversals, an electro-responsive light valve between an observer and the screen through which the light spots on the screen are observed, and a means to control the electro-responsive valve so that the light viewed by the observer through the valve is of controlled value and representative of variations in intensity of light and shadow on elemental points of the subject of which an image is being produced.

In witness whereof I hereunto subscribe my name this 9th day of September, 1930.

AUGUST KAROLUS.